(12) United States Patent
Whritenor et al.

(10) Patent No.: US 9,824,271 B2
(45) Date of Patent: Nov. 21, 2017

(54) ADAPTABLE EYE ARTIFACT IDENTIFICATION AND CORRECTION SYSTEM

(71) Applicant: Kodak Alaris Inc., Rochester, NY (US)

(72) Inventors: James Andrew Whritenor, Mendon, NY (US); Joseph Anthony Manico, Rochester, NY (US); Alexander C. Loui, Penfield, NY (US)

(73) Assignee: KODAK ALARIS INC., Rochester, NY (US)

( * ) Notice: Subject to any disclaimer, the term of this patent is extended or adjusted under 35 U.S.C. 154(b) by 196 days.

(21) Appl. No.: 14/314,941

(22) Filed: Jun. 25, 2014

(65) Prior Publication Data

US 2015/0379348 A1 Dec. 31, 2015

(51) Int. Cl.
*G06K 9/00* (2006.01)
*G06T 5/00* (2006.01)
*H04N 1/62* (2006.01)

(52) U.S. Cl.
CPC ....... *G06K 9/00597* (2013.01); *G06K 9/0061* (2013.01); *G06T 5/00* (2013.01); *H04N 1/624* (2013.01)

(58) Field of Classification Search
CPC ..... G06T 2219/2012; G06T 2219/2004; G06T 15/10; G06T 5/00; G06T 5/50;
(Continued)

(56) References Cited

U.S. PATENT DOCUMENTS 6,009,209 A * 12/1999 Acker ................. G06K 9/0061
  358/520
6,523,954 B1 * 2/2003 Kennedy .............. A61B 5/0013
  351/205

(Continued)

OTHER PUBLICATIONS

H. Schneiderman et al., "Probabilistic Modeling of Local Appearance and Spatial Relationships for Object Recognition," Proc. of CVPR, 1998, pp. 45-51.

(Continued)

*Primary Examiner* — Siamak Harandi
*Assistant Examiner* — Carol Wang
(74) *Attorney, Agent, or Firm* — Hogan Lovells US LLP

(57) ABSTRACT

An adaptable eye artifact identification and correction method is disclosed. Eye artifacts are identified and classified based on color, severity, shape, eye location, and cause. Based on this classification, an eye artifact correction algorithm is selected from a series of eye artifact correction techniques. For minor artifacts, simple color correction techniques are deployed to restore the iris color and to drive the pupil to once again appear black. For severe eye artifacts face detection and metadata analysis are utilized to search the user's image collection for recent images of the subject without the eye artifact condition. Once located, these images provide eye color and shape information for use to replace the pixels expressing the eye artifact condition. The non-artifact eye images are used to provide the appropriate eye color and shape to correct the eye artifact condition for more severe eye artifacts.

17 Claims, 10 Drawing Sheets

(58) Field of Classification Search
CPC ..... G06T 7/001; G06T 3/0093; G06K 9/4661; G06K 9/036; G06K 9/0061; G06K 9/00597; G06K 9/00221; G06K 9/00248; G06K 9/00281
See application file for complete search history.

(56) References Cited

U.S. PATENT DOCUMENTS

| | | | |
|---|---|---|---|
| 6,873,743 B2 | 3/2005 | Steinberg | |
| 7,035,462 B2 | 4/2006 | White | |
| 7,042,501 B1 * | 5/2006 | Matama | H04N 1/0044 348/222.1 |
| 7,158,099 B1 * | 1/2007 | Berube | G03B 15/03 345/9 |
| 7,675,652 B2 | 3/2010 | Demandolx | |
| 8,260,082 B2 | 9/2012 | Rhoda | |
| 8,559,668 B2 | 10/2013 | Reid | |
| 2003/0007687 A1 * | 1/2003 | Nesterov | G06K 9/0061 382/167 |
| 2003/0068084 A1 * | 4/2003 | Kinjo | H04N 1/624 382/164 |
| 2004/0196503 A1 * | 10/2004 | Kurtenbach | H04N 1/00424 358/1.18 |
| 2006/0008173 A1 * | 1/2006 | Matsugu | G06K 9/00228 382/274 |
| 2006/0093238 A1 * | 5/2006 | Steinberg | G06K 9/0061 382/275 |
| 2008/0232711 A1 * | 9/2008 | Prilutsky | G06K 9/0061 382/275 |
| 2008/0317339 A1 * | 12/2008 | Steinberg | G06K 9/0061 382/167 |
| 2008/0317357 A1 * | 12/2008 | Steinberg | G06K 9/00261 382/209 |
| 2009/0220148 A1 * | 9/2009 | Levy | G06K 9/0061 382/163 |
| 2009/0324127 A1 * | 12/2009 | Budagavi | G06K 9/0061 382/275 |
| 2010/0278452 A1 * | 11/2010 | Sarkijarvi | G06T 5/50 382/307 |
| 2010/0302394 A1 * | 12/2010 | Srinivasa Rao | H04N 5/232 348/222.1 |
| 2012/0314247 A1 * | 12/2012 | Rogers | G06T 7/0042 358/1.15 |
| 2013/0335596 A1 * | 12/2013 | Demandolx | H04N 5/2354 348/231.99 |
| 2014/0333413 A1 * | 11/2014 | Kursun | G06K 9/00892 340/5.52 |
| 2015/0009123 A1 * | 1/2015 | Kim | G06K 9/00208 345/156 |

OTHER PUBLICATIONS

T. F. Cootes et al., "Active shape models—their training and application," Computer Vision and Image Understanding, 1995, vol. 61, pp. 38-59.

M.-H. Yang et al., "Support vector machines for visual gender classification," Proc. ICPR, 2000, pp. 1115-1118.

X. Geng et al., "Learning from facial aging patterns for automatic age estimation," ACM Multimedia, 2006, 10 pages.

C. Pantofaru et al., "A Comparison of Image Segmentation Algorithms," CMU-RI-TR-05-40, The Robotics Institute, Carnegie Mellon University, Sep. 1, 2005, 25 pages.

* cited by examiner

Fig. 2

| Eye Artifact Type | Artifact Severity | Available Resources | Correction Method | |
|---|---|---|---|---|
| Illuminant reflection | Low | Replacement images | Recolor Iris/Pupil with sampled best candidate image color | -270 |
| Illuminant reflection | Low | None | Recolor Iris/Pupil with user selected or most likely color | -280 |
| Illuminant reflection | Medium | Replacement images | Recolor Iris/Pupil with sampled candidate image color and Pupil shape | -290 |
| Illuminant reflection | Medium | None | Recolor Iris/Pupil with user selected or most likely color and Pupil shape | -300 |
| Illuminant reflection | High | Replacement images | Replace Iris/Pupil with rescaled best candidate images | -310 |
| Illuminant reflection | High | None | Replace Iris/Pupil with model images and user selected or most likely color and iris shape | -320 |
| Eyewear related Distortion | Low-Med-High | Replacement images | Resize with sampled best candidate image eye size/ocular separation data | -330 |
| Eyewear related Distortion | Low-Med-High | None | Resize with user selected or most likely eye size/ocular separation | -340 |
| Eyewear related Flare | High | Replacement images | Replace Iris/Pupil with rescaled best candidate images and optional user selected lens images | -350 |
| Eyewear related Flare | High | None | User selected lens tint and opacity added to eyewear lenses to mask lens flare condition | -360 |
| Physical eye condition (discolored sclera) | Low-Med-High | Replacement images | With user approval recolor sclera with sampled best candidate image sclera color | -370 |
| Physical eye condition (discolored sclera) | Low-Med-High | None | With user approval recolor sclera with user selected or most likely sclera color | -380 |
| Physical eye condition (misaligned Iris/Pupil pair) | Low-Med-High | Replacement images | With user approval replace at least one Iris/Pupil best candidate images and realign | -390 |
| Physical eye condition (misaligned Iris/Pupil pair) | Low-Med-High | None | With user approval realign at least one Iris/Pupil and replicate missing sclera pixels | -400 |
| Physical eye condition (cataract) | Low-Med-High | N/A | With user approval colorize Pupils black and optional user selected catch lights | -410 |
| Physical eye condition (damaged eye) | High | None | With user approval use mirror image of unaffected eye and replace affected eye | -420 |

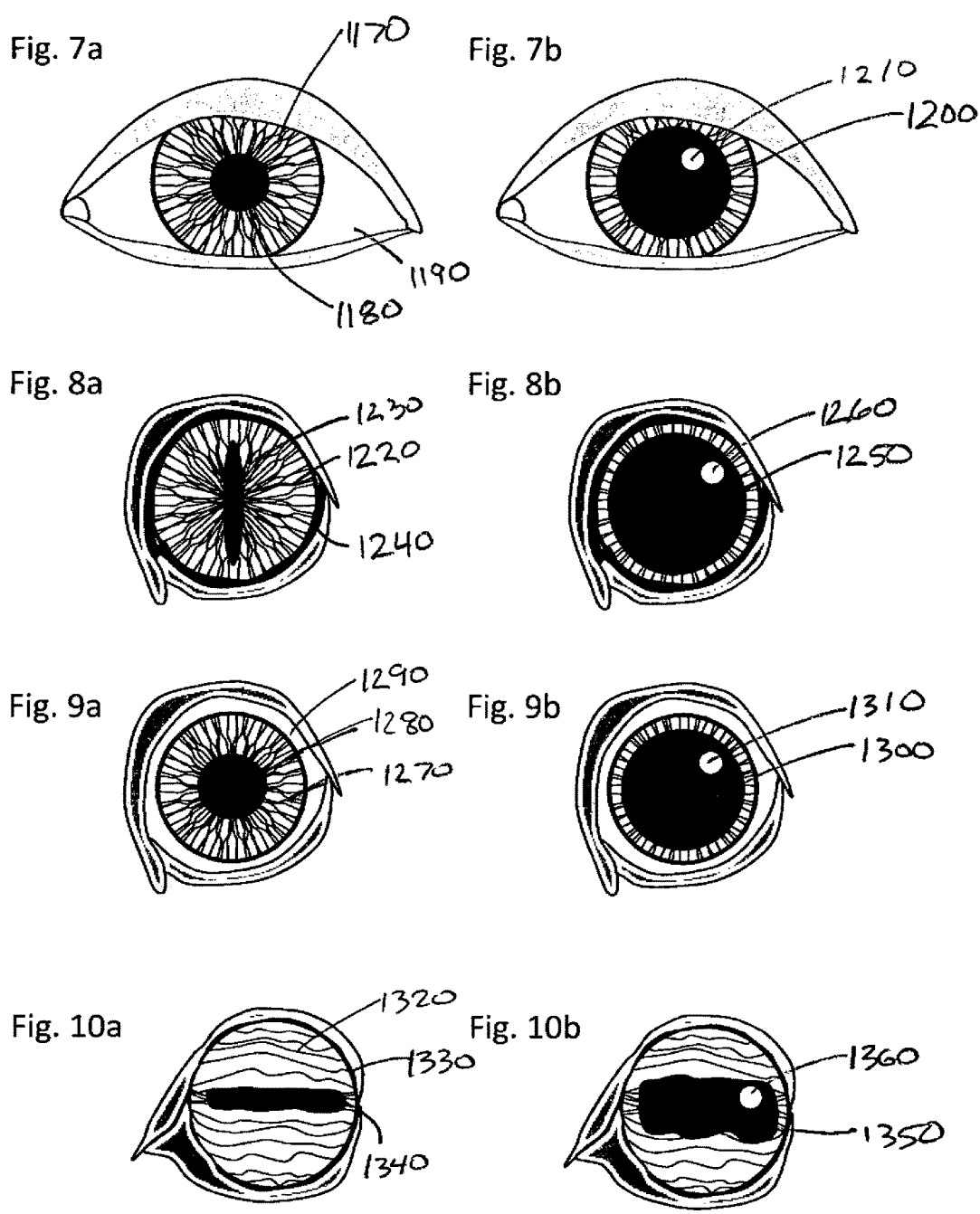

ADAPTABLE EYE ARTIFACT IDENTIFICATION AND CORRECTION SYSTEM

CROSS REFERENCE TO RELATED APPLICATION

Reference is made to commonly-assigned co-pending U.S. patent application Ser. No. 14/444,353 filed on Jul. 28, 2014, entitled SYSTEM AND METHOD FOR CREATING NAVIGABLE VIEWS to Loui et al., the disclosure of which is incorporated herein.

FIELD OF THE INVENTION

The present invention relates to a method for identifying and correcting eye artifacts for use in digital photography.

BACKGROUND OF THE INVENTION

"The eyes are the windows to the soul", is a phrase that helps to illustrate the importance of the appearance of eyes in images to people. In photography, many techniques have been developed for automatic and semi-automatic correction of eye related artifacts caused by electronic flash, LED flash, and other types of scene illumination for use in hand held capture devices and image processing software applications. Conventional techniques typically fail to provide corrections that restore the original eye color, image detail, and iris shape in severe eye artifact conditions from scene illumination techniques. Eye artifacts, especially from flash illumination, can appear in photographs of animals and pets requiring special consideration due to their unique eye structures. In addition, there are other conditions and situations that cause eye related artifacts such as magnification distortions from eyeglasses, lens flare from eyeglass lenses, and physical medical conditions that affect the eye.

U.S. Pat. No. 8,260,082B2, entitled "Pet eye correction," involves identifying expected pupil-location in a digital image determination is made to check that all pixels in a particular region in which the expected pupil-location resides, are provided with a white or a white color. A target color is computed based on analysis of the pixels in a region in which the location resides. A presumed pupil region is identified. An image of a pupil arranged to fit the pupil region is inserted into the pupil region, where the image of the pupil is an image of an iris, this is a generic image and does not replicate the original pupil color or details. Correcting color defects in a pupil of a human and an animal such as pet cat or dog, represented in a digital image, using a computer system. Uses include but are not limited to desktop computer, laptop computer, mainframe computer, personal digital assistant, Blackberry, smartphone device, digital camera and cellular phone. This enables appropriately scaling and inserting the pupil image into the presumed pupil region to facilitate correction of cue ball condition. The presumed pupil region may be identified based at least upon an analysis of the type of animal or person whose pupil is being corrected, as well as the relative size and shape of the pupil being corrected.

U.S. Pat. No. 7,675,652B2, entitled "Correcting eye color in a digital image," describes removing an undesired eye color from a digital image utilized in a flash photography device e.g. digital camera, a web-based camera and an electronic communications device camera such as cell phone, blackberry and personal digital assistant.

U.S. Pat. No. 7,035,462B2, entitled "Apparatus and method for processing digital images having eye color defects," describes graphic user interface and workflow for manual enhancement of automatic red eye correction. The device has a processing unit to detect one or more candidate position of eye color defects in a digital image. A correction unit applies an eye color defect algorithm to the image at the detected candidate positions to correct for the defect. A display presents a portion of the image with corrected eye color defects. An indicator depicts the corrected eye color defects presented on the display.

U.S. Pat. No. 8,559,668B2, entitled "Red-eye reduction using facial detection," involves calculating a distance between two eyes in an original image using a set of received coordinates. A skin tone sample is obtained from the image based on the calculated distance and the received coordinates. A skin tone color region is generated in a color space based on the obtained skin tone sample. A pixel is classified corresponding to one of the eyes as a red-eye pixel by comparing the pixel with the generated skin tone color region and a predetermined red-eye color region. An indication of the classification relative to the pixel is stored.

U.S. Pat. No. 6,873,743B2, entitled "Method and apparatus for the automatic real-time detection and correction of red-eye defects in batches of digital images or in handheld appliances," describes a segment including a red-eye defect in a digital image is identified based on red chrominance and luminance of a color map. The segment is eliminated based on testing threshold value by comparing the attributes of the identified segment and its boundary region with a threshold value. The location, size and pixels of the segment that is not eliminated are recorded, to confirm a red-eye defect.

SUMMARY OF THE INVENTION

According to the present invention, a method for identifying and correcting eye artifacts in digital photography comprises identifying an eye artifact type and a subject eye type, determining eye artifact severity, determining appropriate a correction modality considering available subject eye type correction models, identifying related images within a chronological/event window of a subject without eye artifacts or with less severe eye artifacts, selecting a correction modality and correcting the eye artifact, and obtaining a user or operator approval. The eye artifact type comprises a camera related lighting induced artifact type, an ambient light induced artifact type, an eyewear related artifact type, or a physical condition related artifact type. If the artifact type is determined to a physical condition related artifact type, then the user is alerted and verification is requested to proceed. The subject eye type can comprise a human eye type or an animal eye type. The human eye type can be classified according to race, gender, age, eye color, skin color, eyewear, or facial type. The animal eye type can be classified according to pupil type. Determining eye artifact severity comprises determining whether the eye artifact is correctable or requires replacement. The subject eye type correction models are based on level of severity of the eye artifact, subject type, and eye artifact type. The correction models can rescale and reposition eyes to compensate for optical distortion due to eyeglasses. The correction models can re-colorize eyes based on predicted or assigned color. The predicted or assigned color can be determined using skin tone, hair color, metadata, a social network comment, or user input. The correction models can be used to re-colorize eyes based on color obtained from related images. The related images can be determined using face detection or a tagged image within a chronological/event window. The correction models can be used to replace existing eye images with non-artifact related eye images. The non-artifact related eye images can be selected using appropriate candidate eye images that are rescaled and edited. The correction models can comprise generic models selected and modified with predictions from image analysis and/or metadata for size, color, shape, type, and emotional state. The correction models can comprise generic models selected and modified with related images according to size, color, shape, type, and emotional state, wherein the related images occurred within a chronological/event window. Obtaining a user or operator approval can comprise accepting, editing, or selecting an alternative correction modality. The method of the present invention can be performed at a digital photo kiosk.

The method of the present invention can utilize face identification and position metadata from Android, Picasa, and iPhoto systems to limit search for eye artifact candidates.

The eye related artifacts for humans and animals that can be corrected according to the method of the present invention can include: red eye (retro-reflected flash), white eye, geometric distortion from eyewear lenses, flare from eyewear lenses, contact lens glare, closed or partially eye lids, or eye related medical conditions each requiring a different digital imaging correction technique. The system/method identifies the type and severity of the eye artifact and selects the appropriate correction.

The method of the present invention uses various correction modalities. For example, eye color information of the individual in the image with an eye artifact can be corrected using an unaffected image of the same individual in the image collection. If the eye related artifact is too severe to be corrected with color removal and color restoration the image collection is searched for images of the affected individual for candidate eyes that can be used to digitally replace the affected eyes. Features such as scale, pupil/iris orientation, resolution, time between images, etc. are used to select an appropriate replacement candidate. Automatic modification and placement of replacement candidates can be made with a verification step to allow the user to accept, reject, or modify the automatically edited image.

The method of the present invention can be used to progressively replace sections of the eye to depending on the severity of the artifact.

Worst case mitigation option, if subject in the image has a severe eyewear induced (e.g. lens flare) eye artifact and is wearing eyewear then system would then and add color to the eyewear lenses to make them appear to be sun glasses. The color and opacity of the digital modification can be adjusted automatically to match the subject's appearance or users can select an aesthetically pleasing option.

The method of the present invention includes the option to preserve or add digital catch lights, including a selection of digital catch light styles.

As referred to generally above, the method of the present invention includes the operational steps of locate faces (using face recognition algorithm and/or face location coordinates stored as metadata), determining if eye-artifacts are present (automatic and/or user assisted), determining a face type (human or animal), determining a type of eye related artifact (red eye, white eye, eyewear geometric distortion from lenses, eyewear flare, contact lens glare, closed or partially eye lids, medical conditions), determining the severity of the eye artifact condition (mild to severe), determining if non-artifact candidate images are available (eye shape, type, color, suitable replacement candidates), and determining an appropriate correction option such as neutralize the affected area, colorize the affected area (with a user indicated color), colorizing the affected area (color extracted from same subject from another image), replacing the affected eye with an eye extracted from the same subject from another image, or replace eye with a colorized eye model.

According to the method of the present invention, for profiles where an image of both eyes are unavailable a left eye can be substituted for a right eye if it is digitally flipped.

The method of the present invention can be deployed in a digital photo kiosk, photo booth, image processing software, digital camera, camera phone, or other device capable of algorithmic correction or using an application.

There are many different photographic causes, conditions, eyewear types, and eye types that contribute to eye related artifacts and as a result false positives caused by medical conditions such as a subconjunctival hemorrhage and false negatives such as overly large catch lights that obscure the eyes, are inevitable. Oversight by an operator or user selection or override for autonomous systems, such as a user operator kiosk, smart phone app, or computer program, is provided according to the method of the present invention to correct misidentified eye conditions.

According to the method of the present invention, a look-up table is applied to distinguish between acceptable "catch lights" in the eyes and unacceptable glare from eyeglasses and contact lenses by calculating the opacity, size, position, and shape of the catch light relative to the eye or eyewear if applicable (catch light to eye proportional comparison with a settable threshold proportion).

To further enhance efficacy of the series of algorithms, demographic information about the subject either automatically determined via image analysis or metadata or both, or provided by the user or operator, is used to set thresholds and to select the look-up tables. Broad categories, pull down menus, checklists and the like provide selectable options that can be single choices or multiple choice, such as: "Infant", "Baby", "Toddler", "African-American", "European-American", "Asian-American", "age", "gender", "cat", "dog", or "other animal", or the like.

BRIEF DESCRIPTION OF DRAWINGS

FIG. 2 is a chart describing artifact types, levels of severity, and correction modalities according to the method of the present invention.

FIGS. 7a-7b are graphic illustrations of a constricted and dilated human eye.

FIGS. 8a-8b are graphic illustrations of a constricted and dilated feline eye.

FIGS. 9a-9b are graphic illustrations of a constricted and dilated canine eye.

FIGS. 10a-10b are graphic illustrations of a constricted and dilated sheep/goat eye.

DETAILED DESCRIPTION

Figure 1:
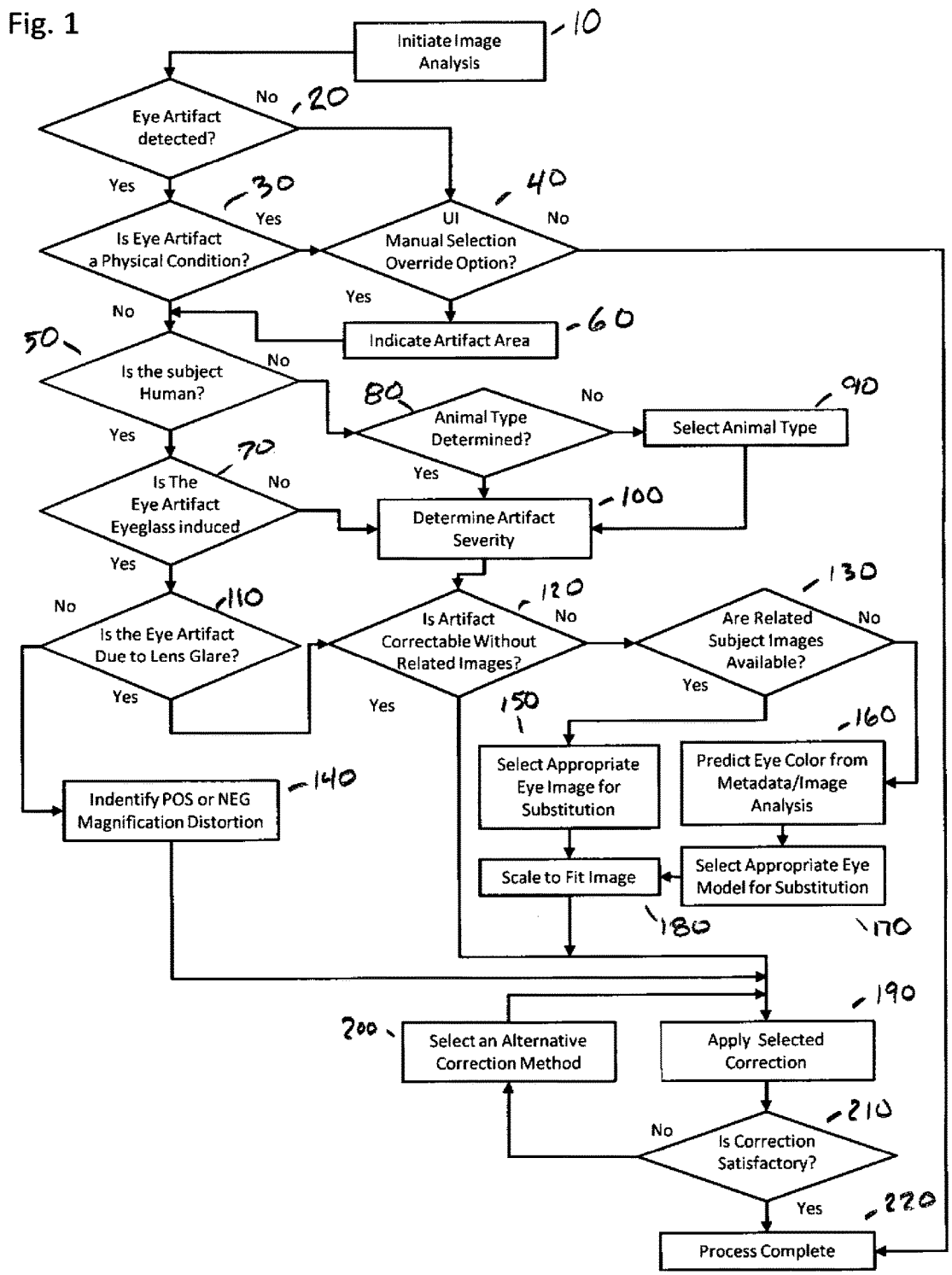
FIG. 1 is a flow chart representing the sequence of operation of the present invention.

The present invention is an adaptable eye artifact identification and correction system. There are various forms of photographic flash illumination related artifacts in photographs involving eyes. In humans, light entering the eye at a certain angle may be reflected from the optic nerve and becomes magnified causing of a white reflection or white pupil in the resulting photograph. When flash illumination is reflected off of the retinas in human eyes a red color from the blood vessels in the eyes is reflected causing the "red-eye" condition familiar to most casual photographers. In very low light situations the need for flash illumination is increased and the eye's iris opens up exacerbating both of white-eye and red-eye conditions. Compact digital cameras and cell phone cameras include xenon or LED (Light Emitting Diode) electronic flash illumination systems and often increase red-eye occurrence, frequency, and intensity because the distance between the camera's lens and flash are reduced to several millimeters due to the small size of the device, decreasing the reflection angle of the flash. As these hand held imaging devices continue to be designed to be smaller and thinner, the lens to flash separation distance is also decreased, increasing the chances for eye related artifacts. In addition, LED based illumination, common on camera phones, has a longer exposure duration illumination and more diffuse light source as compared to electronic xenon type flash and can be used for either still photography or video recording. This type of illumination can cause either red eye if the light reflects off of the human retina or white eye if the light reflects off of the surface of the eye or a contact lens.

Alternative camera based techniques for reducing eye artifacts include increasing the distance between the imaging lens and the electronic flash, and/or employing a "pre-flash" which can be a single flash or a rapid series of flashes just prior to the exposure. "Pre-flash" is used to temporarily reduce the subject's pupil size from the exposure to bright light. The pre-flash technique requires additional power, is distracting to the subject and the surrounding environment, and does not reliably eliminate eye related artifacts. In addition, pre-flash can disrupt the spontaneity of the photographic scene by influencing the subject's expression by either indicating to a subject that a photo has been taken or alerting the subject that cameras are in use.

In pets and animals such as: dogs, cats, raccoons, and ruminants such as cattle, goats, sheep, and deer the retina has a special reflective layer called the tapetum lucidum and acts like a retroreflector at the backs of their eyes which increase the frequency and severity of illuminate induced eye artifacts. Humans do not have a tapetum lucidum layer in their retinas. The iris is a thin structure in the eye responsible for controlling the size of the pupil and thus the amount of light that enters the eye. In addition, humans and dogs have round pupils and cats tend to have vertical slit pupils, and sheep and goats have horizontal slit pupils. A goat's irises are usually pale compared to their pupils and are much more noticeable than in animals such as cattle, deer, most horses and many sheep, whose similarly horizontal pupils blend into a dark iris and sclera. Regardless of shape, the size of the pupil is controlled by the iris which is dependent on the level of ambient illumination. It is popular with consumer "snap shot photography" to photograph people, children, pets, and animals in spontaneous settings with little or no preparation. The coloration caused by the tapetum lucidum can be variations of white, yellow, green, and blue and the color along with the pupil shape can also be used to assist in identifying whether the subject a human or animal and what type of animal.

In situations with very severe eye artifact conditions that cannot be adequately corrected by modifying the existing pixels, the eye images are replaced with eye images sampled from related images of the same subject or generic digital eye models that are adapted to match the color, size, iris color, iris/pupil shape, eye size, and ocular separation of the sampled images of the subject of interest. These selectable models can include versions for males, females, children, and various types of animals. In addition to providing positioning information, ocular separation, the measurable distance between eyes, can also be used to determine eye size and for rescaling the size of eyes. If eye images or eye models are used to replace the severe eye artifact affected images, it is critical that they replicate the viewing direction of the original subject and/or are pointing in the same direction to avoid appearing "cross-eyed" or appear to be looking in an odd direction, such as looking down or appear to be rolling their eyes. Related images of the subject can be obtained from any of the conventional sources of digital images, such as online image accounts, home computers, images stored on mobile devices and related accounts, images stored on social networks, and images from medical archives or database. The images can come from any accessible source as long as the user of the system has access to the images and freedom to use them. The related images of the subject for use to replace eye images with severe eye artifacts can be identified using face detection techniques and/or image related metadata or tags such as the individual's name.

A measurement of the eye size or ocular separation can be used to rank potential eye replacement candidates with higher ranking given to those candidates that are the same size or larger to severe artifact effected eyes. The same size or larger candidate eyes of the same subject have adequate or greater image detail and larger eyes can be scaled down to match the severe artifact affected eyes. It may seem that a typical user would resist the more extreme approaches to eye artifact correction, but in cases of photographs of special significance or from one of kind events such as weddings, birthdays, and sporting events where re-taking images spoiled by eye artifacts is impractical if not impossible, this provides a reasonable approach to salvaging the image.

Over the years, users have demonstrated a willingness to alter photographs to enhance the appearance of the photograph and/or the subject. Digital "airbrushing" or "retouching" techniques to improve the appearance of images are well known practices and image editing programs such as Adobe Photoshop provides the tools required to perform simple or complex digital image editing depending on the skill of the user. Techniques to remove blemishes, wrinkles, and acne via "digital airbrushing" techniques where affected skin blemish pixels are replaced with pixels from a nearby area of unaffected skin pixels are well known and popular. This is a simple to implement technique since human skin has far less complex detail to replicate and lacks the variable direction, iris size, eye lid, and expressive nature of human and animal eyes. It is important, when correcting severe eye artifacts, to consider the head size of the subject in the image in that large head sizes such as with portraits or extremely magnified images require more accurate and detailed corrections than medium or distance photographs. Head and face size are also factors in selecting the appropriate correction technique. For example, if the image to be corrected is a photograph taken at a distance and the subject has a flash illumination induced red eye condition simple re-colorization of the affected pupil or pupil and iris pixels may be adequate.

In images where the eye artifact is very severe and obscures the image of the eye and no other related image or information on the subject's eye color is available, the system can predict the color of the user's eye. Geographic location, based on location metadata associated with the image or the location of the image processing activity, ethnic background, user selected or provided eye color information, hair color, and skin color, none of which are affected by the eye artifact can be used to predict the likely eye color of the user. In some cases where non-artifact images are inappropriate for user in correcting eye artifact images such as having reduced resolution or only depict the subject in profile these images are used to adapt selected generic eye models which would be used to replace the pixels containing the eye artifact condition. In the most severe cases of eye artifact conditions where no non-artifact images of the subject are available, hair and skin color and geographic location is used to provide the generic eye models with the statistically most likely eye color. The eye color can also be a user or operator selection.

Over 55% of the world's population has brown eyes. Brown eye color is a dominant genetic trait and is created by melanin in the eye. Nearly all individuals from Africa and Asia have brown eye color. Brown eyes tend to be darker than other eye colors and range from light brown to black in appearance. Hazel eyes are similar to brown eyes, but are lighter and have more of a green-yellow tint. The color appearance of hazel eyes can change with ambient lighting conditions and up to 8% of the world's population has hazel colored eyes. Blue eye color is a recessive genetic trait and much less common with only approximately 8% of people have blue eyes. Blue eyes are far more common in people from northern Europe and blue eyes have a lower amount of pigmentation and the blue color is formed by the scattering of light by the stroma of the iris. Gray or silver eye color is very rare variation of blue. Like blue eyes, gray eyes are the result of a very low amount of pigmentation in the eye, which reflects a gray-silver appearance. Silver eye color is most common in eastern European countries, and is one of the rarer eye colors worldwide. Green eye color is often confused with hazel. Green eye color is the rarest, accounting for around 2% of the world. Green eye color is a result of a small amount of lipochrome, a form of pigment associated with green, amber, and gold tones in human eyes and the eyes of other mammals. When combined with the natural blue scattering of the eye, the colors mix to give a green appearance. Green eye color is most common in northern and central Europe and on rare occasions in people from western Asia. Amber eyes have a yellowish copper tone, which results the pigment lipochrome. Amber eye color can range from golden yellow to copper. Amber eyes are very rare worldwide, and are most common in Asia and South American countries. With information on geographic location, hair color and skin color a Look-Up-Table (LUT) is be used to predict the subject's eye color. This alternative approach is designed to be used to salvage an important or one of a kind image ruined by a severe eye artifact. With all of the techniques presented, the size of the subject's face relative to the scene is very important. More care must be taking with close up portraiture in that more details are present. The Martin-Schultz scale is a standard color scale to establish the eye color of an individual. The scale consists of 16 colors from light blue to dark brown-black.

Eye color categorization is quantifiable such as with the Martin-Schultz Scale which provides three broad classifications, A—Light Eyes, B—Mixed Eyes, and C—Dark Eyes. On this scale Light Eyes have the highest numerical ranking of 12-16 and include: blue, grey and green eyes. The numerical value decreases as the amount of gray coloration diminishes. Mixed Eyes range from 6-12 on the scale and include: gray, blue or green eyes that include similar amounts of brown pigmentation. Dark Eyes range from 1-6 on the scale and are further classified into two subgroups: Dark mixed range from 4-6 include predominantly brown eyes with some mixtures of light pigments. Dark eyes range from 1-4 on the Martin-Schultz Scale and include: light brown, dark brown dark brown which appear to be near black in eye color. Eye color types also have demographical and geographical distribution throughout the world.

The Martin-Schultz scale is a standard color scale commonly used in physical anthropology to establish more or less precisely the eye color of an individual: it was created by the anthropologists Martin and Schultz in the first half of the 20th century. The scale consists of 16 colors, from light blue to dark brown-black.

1-2: blue iris (1a, 1b, 1c, 2a: light blue iris-2b: darker blue iris)
3: blue-gray iris
4: gray iris
5: blue-gray iris with yellow/brown spots
6: gray-green iris with yellow/brown spots
7: green iris
8: green iris with yellow/brown spots
9-11: light-brown iris
10: hazel iris
12-13: medium brown iris
14-15-16: dark-brown and black iris Eye Color Distribution Percentages
Statistic Verification
Source: American Academy of Ophthalmology
Date Verified: 1.1.2014
Eye Color U.S. Percent
Blue/Grey Irises: 32%
Blue/Grey/Green Irises with Brown/Yellow Specks: 15%
Green/Light Brown Irises with Minimal Specks: 12%
Brown Irises with Specks: 16%
Dark Brown Irises: 25%

The predicted eye color value (in the Martin-Schultz scale) can be calculated as a function of the geographic location of the kiosk/station or GPS image tag or IP address of a client computer, color of the user's skin, color of user's hair, and other user information (such as ethnicity) if available.

Eye color categorization is quantifiable such as with the Martin-Schultz Scale which provides three broad classifications, A—Light Eyes, B—Mixed Eyes, and C—Dark Eyes. On this scale Light Eyes have the highest numerical ranking of 12-16 and include: blue, grey and green eyes. The numerical value decreases as the amount of gray coloration diminishes. Mixed Eyes range from 6-12 on the scale and include: gray, blue or green eyes that include similar amounts of brown pigmentation. Dark Eyes range from 1-6 on the scale and are further classified into two subgroups: Dark mixed range from 4-6 include predominantly brown eyes with some mixtures of light pigments. Dark eyes range from 1-4 on the Martin-Schultz Scale and include: light brown, dark brown dark brown which appear to be near black in eye color.

Assuming that the geographic location (GL), hair color (HC), and skin color (SC) are available and can be used to predict eye color when other information are lacking. The idea is to narrow down the color group, and the user can then fine turn to select the actual color from that color group. This can be accomplished using a ring-around user interface to select the right eye color replacement.

The probability of each of the 3 color groups (A, B, or C) mentioned in the above paragraph can be computed as follows (EC stands for Eye Color):

$$Pa = P(EC=A|GL=X \cap HC=Y \cap SC=Z) \approx P(EC=A|GL=X)$$
$$* P(EC=A|HC=Y) * P(EC=A|SC=Z)$$

$$Pb = P(EC=B|GL=X \cap HC=Y \cap SC=Z) \approx P(EC=B|GL=X)$$
$$* P(EC=B|HC=Y) * P(EC=B|SC=Z)$$

$$Pc = P(EC=C|GL=X \cap HC=Y \cap SC=Z) \approx P(EC=C|GL=X)$$
$$* P(EC=C|HC=Y) * P(EC=C|SC=Z)$$

(Assuming independence of the variables (GL, HC, and SC) to simplify the computation. Otherwise the use of Baye's rule can be applied)

Predicted eye color=color group represented by Max$\{Pa, Pb, Pc\}$

For example, X=Asia, Y=black, and Z=medium $$Pa = 0.3*0.3*0.35 = 0.032$$

$$Pb = 0.5*0.5*0.5 = 0.125$$

$$Pc = 0.9*0.9*0.75 = 0.608$$

In this case, Max $\{Pa, Pb, Pc\}$=Pc, which implies the predicted eye color group is C, which represents the Dark Eyes group.

The probability values used in the above example can be obtained from a probability table (see Table 1) constructed using prior knowledge about the probability distributions of the 3 variables.

is exacerbated by large lenses made out of glass or low index plastic and larger eyeglass frames that position the lens farther from the eye.

The same image manipulation techniques for correcting photographic eye artifacts can be used to improve or correct eye artifacts caused by physical eye problems that are not associated with photographic conditions. The appearance of conditions such as, conjunctivitis, blood shot eyes, subconjunctival hemorrhage, strabismus, oculocutaneous albinism, or cataracts in photographs can be improved or corrected. With oculocutaneous albinism, the eye cannot produce enough pigment to color the iris blue, green or brown and add opacity to the eye: instead the eye appears red, pink or purple, depending on the amount of pigment present also due to the red of retina being visible through the iris. Some types of albinism affect only skin and hair color, other types affect skin, hair, and eye color, or eye color only. Amblyopia (also called "lazy eye") is an eye disorder characterized by an impaired vision in an eye that otherwise appears normal, or out of proportion to associated structural abnormalities of the eye. Medical conditions should not be mistaken for photography related eye artifacts and care must be taken with commercial systems to prevent this. The system can include algorithms that can distinguish between medical conditions and photography related eye artifacts. It is important to not assume that all subjects would be comfortable with correcting the appearance of a physical eye condition. The operator can be alerted by the system of an undetermined cause of and eye artifact and/or the operator can be trained to recognize these conditions. This is less of an issue with a user controlled system such as camera, photo kiosk, or image manipulation software, where the user can choose to correct the condition or not by voluntarily.

An image collection with images of the subject with a severe eye artifact condition is used to determine if candidate images are available. Candidate images are additional, relatively recent images of the same subject for use to replace portions of the subject's eyes to compensate for the eye artifact condition. Subject images, such as outdoor

TABLE 1

Probability Table for Eye Color Groups (values are extrapolated from available statistics)

| | GL | | | | HC | | | | SC | | | |
|---|---|---|---|---|---|---|---|---|---|---|---|---|
| | | | | | | | | | Light, White, Fair (I, II) | Medium, Light brown (III) | Olive, Moderate Brown (IV) | Brown, Dark Brown, Black (V, VI) |
| | Asia | North Amer. | Central & South Amer. | Europe | M.E & Afr. | Blond | Red | Black | White/ gray | | | |
| A | 0.3 | 0.75 | | 0.85 | | 0.9 | | 0.3 | * | 0.9 | 0.35 | 0.3 | 0.2 |
| B | 0.5 | 0.5 | | 0.6 | | 0.5 | | 0.5 | * | 0.5 | 0.5 | 0.55 | 0.55 |
| C | 0.9 | 0.25 | | 0.35 | | 0.2 | | 0.9 | * | 0.2 | 0.75 | 0.8 | 0.9 |

*In the case where age induced white/gray or artificial hair colors are detected, the effect of the HC component can be reduced or eliminated.

Typically eye related artifacts are caused by camera related illumination such as electronic flashes, but there are other there are other sources of eye related artifacts such as ambient lighting, eye glasses, and physical conditions. High minus lenses for nearsightedness can cause the subjects eyes to appear smaller in photographs. This is exacerbated by large lenses made out of glass or low index plastic and larger eyeglass frames that position the lens farther from the eye. High plus lenses for farsightedness can cause the eyes to appear magnified. This condition can be reduced by using lenses made of high index plastics such as polycarbonate, and keeping the lenses small. As with high minus lenses this images, where typically no illuminate eye artifact conditions exist and subject images with a similar or greater head size or ocular separation would be ranked higher as candidate images. Also if the eye artifact image was caused by eyewear induced geometric distortions and or lens flare, candidate subject images without eyewear would also be ranked higher. Detected images are ordered in a chronological way by ordering by metadata recorded time of capture. To order the matched images in chronological time order, the captured date/time information extracted from the header of the images (e.g., EXIF header from a JPEG image) can be used. A face detection algorithm such as the face detector described in "Probabilistic Modeling of Local Appearance and Spatial Relationships for Object Recognition", H. Schneiderman and T. Kanade, Proc. of CVPR'98, pp. 45-51, can be used here. A time based ordering scenario can be accomplished by using a combination of face detection and clustering algorithms. A face detection algorithm is applied to first determine the location of detected faces. Then facial features can be extracted, for example, using an Active Shape Model as described by T. F. Cootes, C. J. Taylor, D. H. Cooper, and J. Graham in the paper "Active shape models—their training and application," *Computer Vision and Image Understanding* (61): 38-59, 1995, to extract facial feature points. These facial feature points can then be used to determine clusters with similar faces (i.e., faces having similar facial feature points). The age of the face can then be determined by user profile data if available or estimated by an age and gender algorithms such as those described in "Support vector machines for visual gender classification" by M.-H. Yang and B. Moghaddam, Proc. ICPR, 2000, and "Learning from facial aging patterns for automatic age estimation" by X. Geng, Z.-H. Zhou, Y. Zhang, G. Li, and H. Dai, ACM MULTIMEDIA 2006. An ordering scenario by images with a same person in chronological order can be achieved by using face detection and clustering to identify the images of the same person, followed by extracting the date/time information from the image header to determine the chronology.

Using object recognition, segmentation, and extraction techniques the individual portions of the eye such as pupil, sclera, iris, eye lids and eye lashes can be independently modified, replaced with rescaled replacement images or with computer generated images, or used to provide other information such as eye size and ocular separation. These techniques are also used to extract candidate eye images and eye components from image collections that a user has access to. The eyes location on the face can be treated as stationary objects as described in the Loui patent, which was previously incorporated by reference. Specially, from the facial feature points, one can precisely locate the eye positions relative to the face region. Then using image processing techniques such as mean shift algorithm, the various regions of an eye (iris, pupil, and sclera) can be segmented and replaced with the appropriate eye color replacement parts. A reference for different image segmentation algorithms can be found in the technical report "A comparison of image segmentation algorithms," by C. Pantofaru, and M. Hebert, CMU-RI-TR-05-40, The Robotics Institute, Carnegie Mellon University, Sep. 1, 2005.

The goal of this invention is to provide a method to identify the type of eye related artifact caused by photographic conditions and to properly correct it using a range of techniques and various types of content. The resulting artifacts are highly undesirable and most people choose to correct these conditions in the resulting photographic images. The process utilizes face detection, eye detection, face location metadata, or manual indication to locate the eyes in a digital image. Once the eyes are located they are analyzed to determine if an artifact exists. If the face detected is a human face and one or both eyes have artifacts that are red or white, they are corrected with dark neutral color and a round shape. If the face is determined to be an animal face and one or both eyes has a green, blue, or white artifact, the type of animal is identified. Alternatively a user could select a face type such as human, dog, cat, etc. from a menu for each face for selection. With typical "automatic red eye correction" digital imaging techniques are used to replace or modify the artifact related pixels with neutral colored pixels. If it is a dog, the artifact is corrected with dark neutral color and a round shape. If the animal is determined to be a cat, the artifact is corrected with dark neutral color and a vertical slit or ellipse shape. In situations where a series of images of the same subject are available, as determined by eye, face, or object recognition techniques and augmented by location or temporal metadata, if available, and those images do not contain eye related artifacts, those image can be used to further correct the eye artifact condition. The further corrections include, correcting/replacing the iris shape, details, shape, and structure by sampling or cloning the pixels of the non-artifact eye images of the same subject. In the case where a replacement eye for the affected subject, but we have ones for the parents. In such situation, a replacement eye may be predicted from the color and characteristics of the parents' eyes. A related scenario is to use the eye color and characteristics of a sibling (or close relative) to predict the one for the affected subject. This scenario may be applicable for users of social networks such as Facebook, where family members share their images and videos. In addition the option is provided for selecting a false color and/or eye type by a user for artistic or entertainment purposes such as a human who has blue eyes may select the option for green cat eyes in their image.

FIGS. 11*a*-11*e* are graphic illustrations of human eyes with various types of digitally created catch lights, which is also referenced below.

In addition to correcting eye related artifacts it is desirable to preserve or create "catch lights" in the eyes. "Catch lights" or "eye lights" are specular highlights in a subject's eye in an image and are produced by the camera flash or by an additional natural light source, such as a reflection of the Sun or a day lit scene, or artificial light source, such as a second flash of studio light. Catch lights may be a natural artifact of the lighting method, have been purposely created by special lighting effects, or added using digital editing techniques. Catch lights adds a sparkle to a subject's eyes helping to draw attention to them and are usually an aesthetically desirable artifact especially in portraiture, since eyes without catch lights often have a dull or lifeless appearance. Catch lights also enhance images of a subject with a positive or happy expression. Lighting is often arranged in studio portraits specifically to create attractive catch lights. Catch lights can appear on the pupil, iris, or both and can be a simple sharp white dot, soft glow, or reflection of the scene visible to the subject. Catch lights appear in the same relative position in each of the subject's eyes but do not affect other parts of the scene or the subject. Catch lights can be added digitally after the photograph is exposed using pre-stored imagery including sharp or soft white dots, objects such as windows, and pseudo-scene reflections. This technique can also include personal images such as an image of a child or of a loved one. With digitally added eye reflections the appropriate geometric distortions are applied the image to replicate the appearance of a reflection on the spherical surface of the eye. In addition, the opacity, contrast, and brightness of the catch light image can be controlled to further enhance the natural look of a digitally created eye reflection catch light. Users can directly control the appearance and placement of catch lights and eye reflections or they can select from a series of presented options.

In an alternative embodiment or optionally provided feature, in addition to automatically correcting eye related artifacts, the present invention can be used for entertainment, amusement, and creative applications. A user can replace or modify non-artifact or artifact affected eyes to, for example, to create an image of a subject with so called "Barbie Eyes" to make the subjects eyes look larger and/or have a hyper-saturated or unnatural color such as purple or emerald green. This is a popular interest with some users as demonstrated by the availability of contact lenses that change the user's pupil shape to replicate the appearance of a "cat's eye" and/or change the user's eye color. Contact lenses of this type are currently available in range of styles and colors including extreme treatments such as flames, flowers, colored patterns, animal eye types, "zombie eyes", geometric shapes, sports team logos, stars, graphics, text, and so forth. These and more styles, patterns, and colors, are possible with the present invention with additional computer generated, real world, or digitally modified images of unusual or amusing eye types. These treatments can be refreshed from time to time and/or can be modified to meet seasonal demands such as "monster eyes" for Halloween, colorful ornaments for Christmas, and fireworks for the 4 of July.

Alternative GUI configurations, such as a dynamic ring around presentations where the user selects a corrected image and from, for example a "3×3 matrix" of images each modified using a separate correction technique and/or degrees of correction are used to further simply the user interaction. Other GUI implementations include "best choice" where the system determines the optimum correction and presents it to the user for acceptance or rejection. If rejected an alternative correction technique and/or degrees of correction is deployed and the alternative corrected image is presented to the user and the process is continued until the user sees a version that meets their requirements.

Yet another GUI applies various correction techniques and/or degrees of correction results are presented at random until the user selects the result that they find acceptable. These approaches are ideally suited for systems with smaller displays with touch, gesture, and voice input modalities since simple selections are that is required to produce an acceptable result. These techniques also remove the need for user training on tool selection and use and replacing it with a selection of preferred result choices. In other words, this enhanced GUI process replaces the image editing process with an image selection process. With all of the techniques and interfaces discussed the system can record the user's selections to determine user preferences to enhance and customize the process as the user interacts with the system. If multiple users access the same system individual user profiles are maintained.

FIG. 1 is a flow chart representing the sequence of operation of the method of the present invention. The method of the present invention begins with an image analysis step 10, and proceeds to an eye artifact decision step 20. If an eye artifact is detected, the method proceeds to a physical condition decision step 30. If an eye artifact is not detected, the method proceeds to a UI selection override decision step 40. At step 30, if a physical condition is detected the method proceeds to the UI selection override decision step 40. If a physical condition is not detected the method proceeds a human subject decision step 50. At step 40, is the override option is selected, the method proceeds to an artifact indication step 60, which returns the method to the human subject decision step 50. If the override option is not selected, the method is terminated at process completion step 220. At step 50, if a human subject is detected, the method proceeds to eyeglass induced decision step 70. If a human subject is not detected, the method proceeds to animal type decision step 80. At step 80, if an animal type is determined, the method proceeds to a determine artifact severity step 100. If an animal type is not determined, the method proceeds to a select animal type step 90 and then proceeds to the determine artifact severity step 100. At step 70, if an eyeglass induced artifact is detected, the method proceeds to an eye artifact lens flare induced decision step 110. At step 70, if an eyeglass induced artifact is not detected, the method proceeds to an artifact correctible without related images decision step 120. At step 120, if the artifact is correctable without related images, the method proceeds directly to apply selected correction step 190. However, if the artifact is not correctable without related images, then the method proceeds to related images available decision step 130. If related images are available, then the method proceeds to a select appropriate eye image step 150 and to a scale to fit image step 180, and then to apply selected correction step 190. At step 130, if related images are not available, the method proceeds to a predict eye color from metadata/image analysis step, to a select appropriate eye model step, to the scale to fit image step, and then to apply selected correction step 190. Returning to step 110, if the eye artifact is not due to lens glare, then the method proceeds to identify positive or negative magnification distortion step 140, and then to the apply selected correction step 190. After step 190, the method proceeds to a correction satisfactory decision step 210. If the correction is satisfactory, then the method is terminated at process completion step 220. If the correction is not satisfactory, then the method proceeds to a select alternative correction step 200, and then to the apply selection correction step 190 for a second try at correct the eye artifact. Steps 190, 210, and 200 can be continued in succession for as many tries as necessary to correct the eye artifact.

FIG. 2 is a chart describing artifact types, levels of severity, and correction modalities according to the method of the present invention. The column headings in FIG. 2 include an artifact type column 230, an artifact severity column 240, an available resources column 250, and a correction method column 260. The row entries for each of the rows and corresponding to each of the columns entries from left to right are described in turn:

Row 270 Illuminant, low severity, with replacement images row

Row 280 Illuminant, low severity, without replacement images row

Row 290 Illuminant, medium severity, with replacement images row

Row 300 Illuminant, medium severity, without replacement images row

Row 310 Illuminant, high severity, with replacement images row

Row 320 Illuminant, high severity, without replacement images row

Row 330 Eyewear related distortion with replacement images row

Row 340 Eyewear related distortion without replacement images row

Row 350 Eyewear related flare, high severity with replacement images row

Row 360 Eyewear related flare, high severity without replacement images row

Row 370 Physical eye condition (discolored sclera) with replacement images row

Figure 3A:
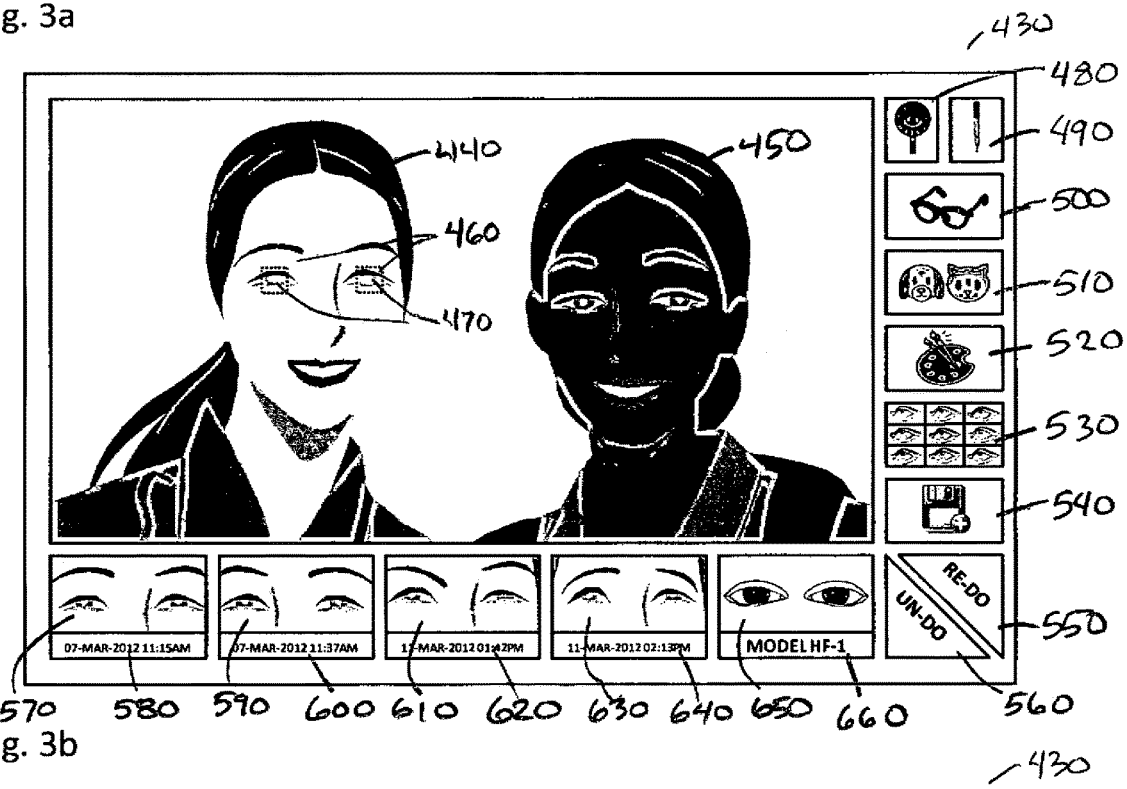
FIGS. 3a-3b are illustrations of a Graphic User Interface being used to correct scene illumination related eye artifacts in humans according to the method of the present invention.
Figure 3B:
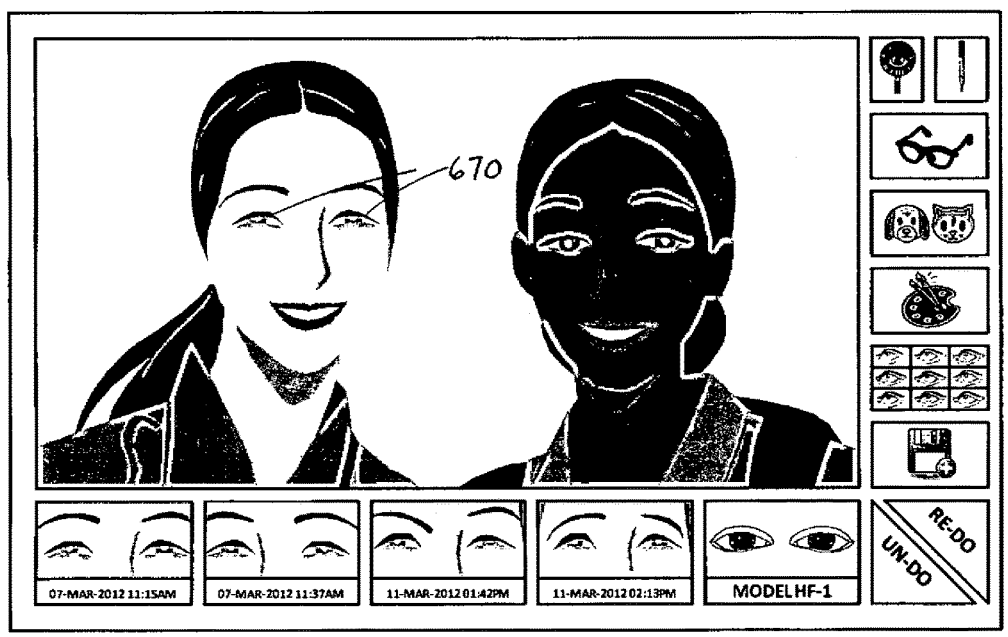

Row 380 Physical eye condition (discolored sclera) without replacement images row Row 390 Physical eye condition (misaligned iris/pupil pair) with replacement images row Row 400 Physical eye condition (misaligned iris/pupil pair) without replacement images row
Row 410 Physical eye condition (cataract) row
Row 420 Physical eye condition (damaged eye) row FIGS. 3a-3b are illustrations of a Graphic User Interface (GUI) 430 being used to correct scene illumination related eye artifacts in humans according to the method of the present invention. Referring now to FIG. 3a the GUI displays a first subject 440 with an illumination related eye artifact and a second subject 450 without an illumination related eye artifact. The first subject 440 includes an eye artifact indication icon 460 and an illumination related eye artifact 470. A column along the right-hand side of the GUI 430 includes a close-up navigation tool icon 480 and a color sampler tool icon 490, an eyewear tool icon 500, an animal tool icon 510, a manual editing tool icon 520, a ring-a-round user interface 530, a save file icon 540, and a re-do icon 550 and an un-do icon 560. A row along the bottom of the GUI 430 includes a 1st ranked replacement image 570 including a 1st ranked image metadata indicator 580, a 2nd ranked replacement image 590 including a 2nd ranked image metadata indicator 600, a 3rd ranked replacement image 610 including a 3rd ranked image metadata indicator 620, a 4th ranked replacement image 630 including a 4th ranked image metadata indicator 640, and an eye model 650 for a female human including an eye model type indication 660. Referring now to FIG. 3b a corrected eye artifact 670 is shown on the first subject 440.

Figure 4A:
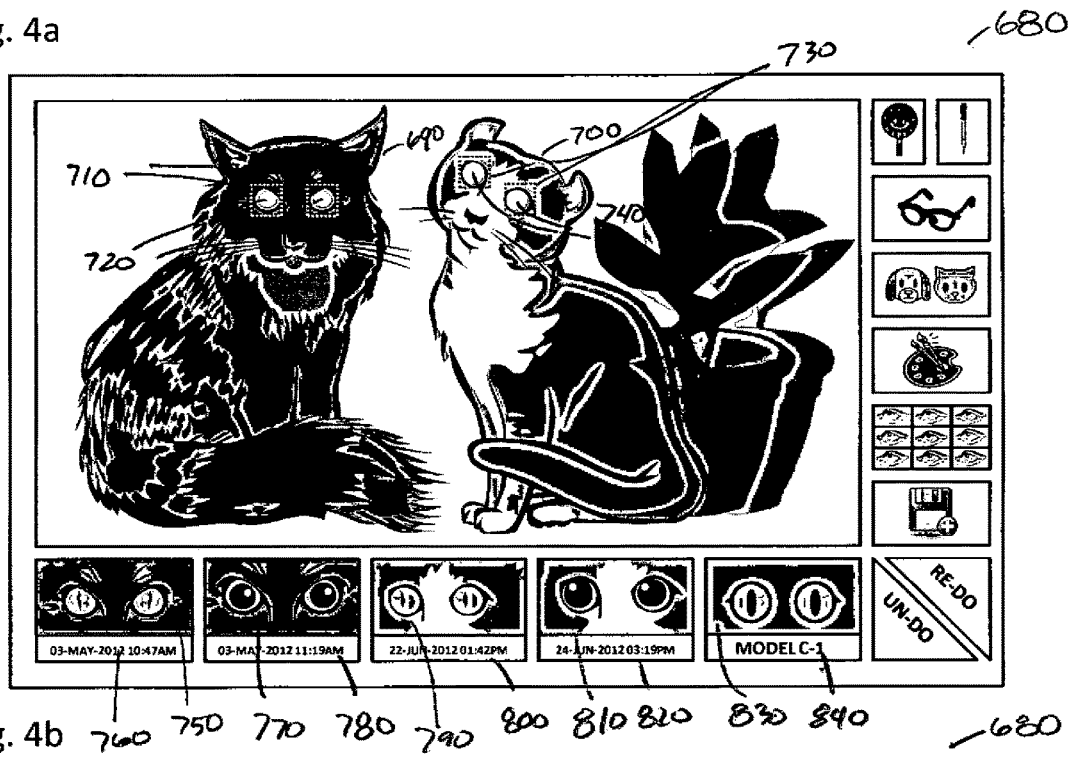
FIGS. 4a-4b are illustrations of a Graphic User Interface being used to correct scene illumination related eye artifacts in animals according to the method of the present invention.
Figure 4B:
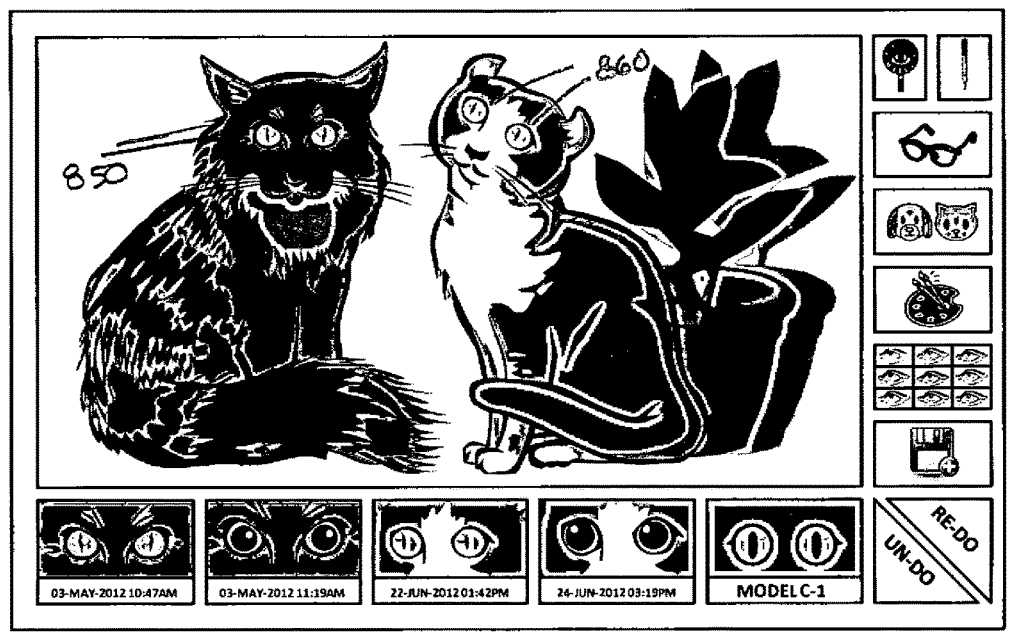

FIGS. 4a-4b are illustrations of a Graphic User Interface (GUI) 680 being used to correct scene illumination related eye artifacts in animals according to the method of the present invention. The column icons shown in FIGS. 4a-4b are substantially the same as those previously shown with respect to GUI 430 shown in FIGS. 3a-3b. The GUI 680 displays a first animal subject 690 with an illumination related eye artifact and a second animal subject 700 with an illumination related eye artifact. The first animal subject includes an eye artifact indication icon 710 (light color complimentary to subject color) and an illumination related eye artifact 720. The second animal subject includes an eye artifact indication icon 730 (dark color complimentary to subject color) including an illumination related eye artifact 740. The bottom row of GUI 680 displays a 1st ranked replacement image 750 for the first animal subject (pupils constricted) and a 1st ranked image metadata indicator 760, a 2nd ranked replacement image 770 for the first animal subject (pupils dilated) and a 2nd ranked image metadata indicator 780, a 1st ranked replacement image 790 for the second animal subject (pupils constricted) and a 1st ranked image metadata indicator 800, a 2nd ranked replacement image 810 for the second animal subject (pupils dilated) and a 2nd ranked image metadata indicator 820, and an eye model 830 for an animal type (cat) and an eye model type indication 840. Referring now to FIG. 4b, a corrected eye artifact 850 (using the 1st ranked first subject replacement image) and a corrected eye artifact 860 (using the 1st ranked second subject replacement image) are displayed.

Figure 5A:
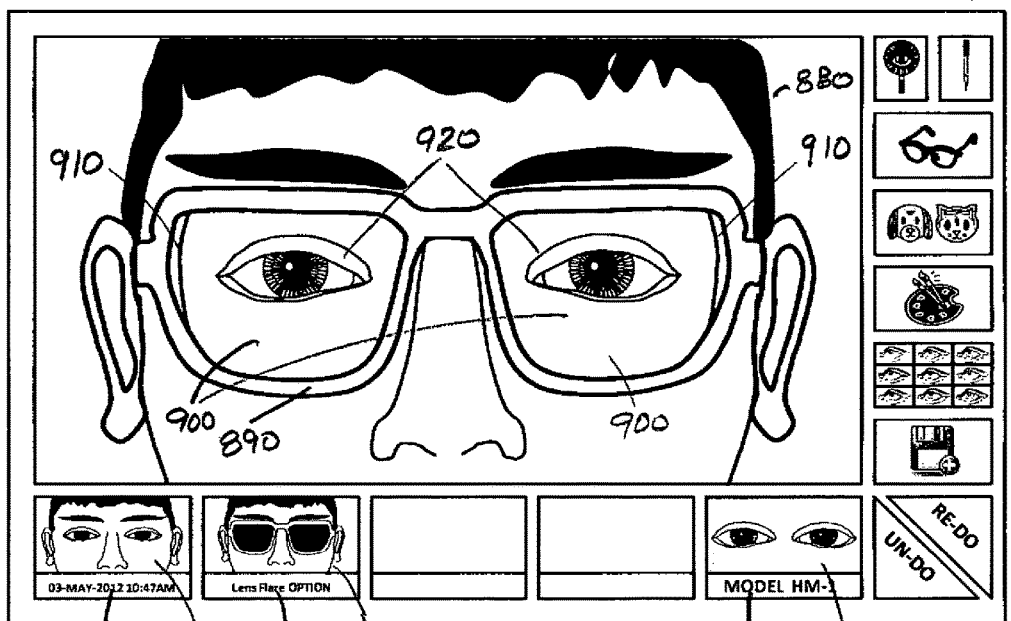
FIGS. 5a-5b are illustrations of a Graphic User Interface being used to correct eyewear related eye artifacts in humans according to the method of the present invention.
Figure 5B:
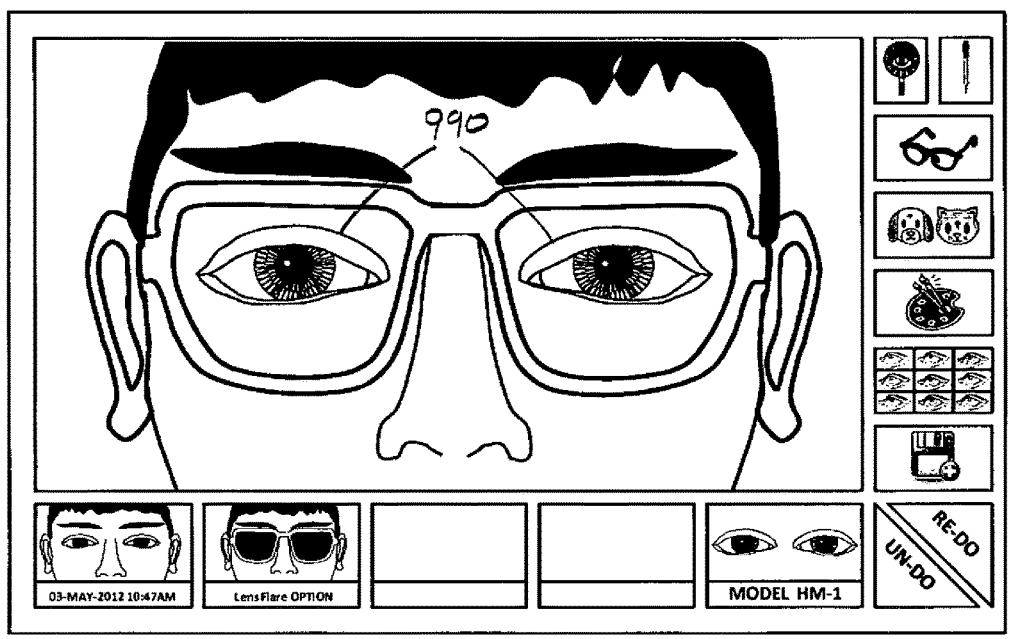

FIGS. 5a-5b are illustrations of a Graphic User Interface (GUI) 870 being used to correct eyewear related eye artifacts in humans according to the method of the present invention. Again, the column icons are as previously discussed. Referring to FIG. 5a the GUI 870 displays a human subject 880 with eyewear related distortion, an eyewear frame 890, a high minus eyewear lens 900, an eyewear lens induced magnification distortion 910 (high minus lenses), and an eyewear lens induced eye magnification distortion 920 (high minus lenses). The bottom row of the GUI 870 displays a 1st ranked replacement image 930 of the subject without eyewear and a 1st ranked image metadata indicator 940, an optional modified image 950 with artificially colored lenses to mask uncorrectable eye artifacts and an optional correct type indicator 960, and an eye model 970 for a human male and an eye model type indication 970. Referring now to FIG. 5b, a corrected eyewear induced distortion artifact 990 is displayed.

Figure 6A:
FIGS. 6a-6f are graphic illustrations of various types of eye related artifacts.
Figure 6B:
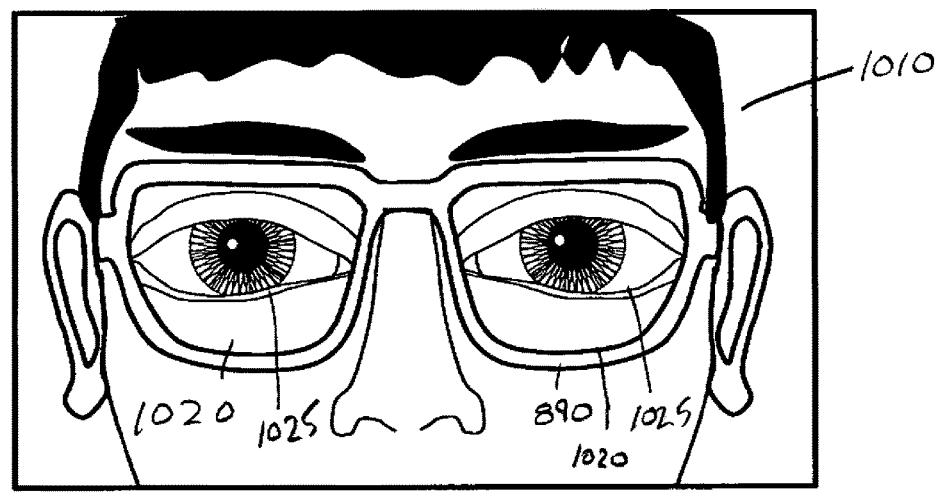
Figure 6C:
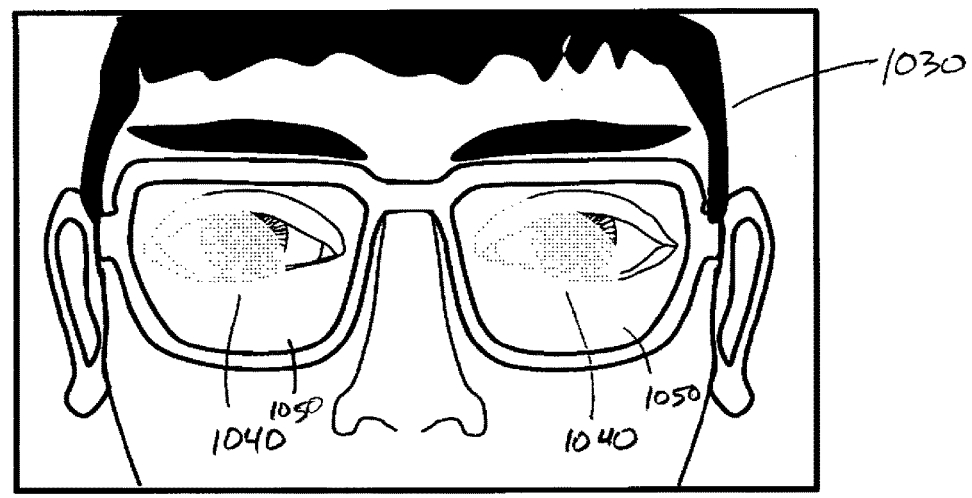
Figure 6D:
Figure 6E:
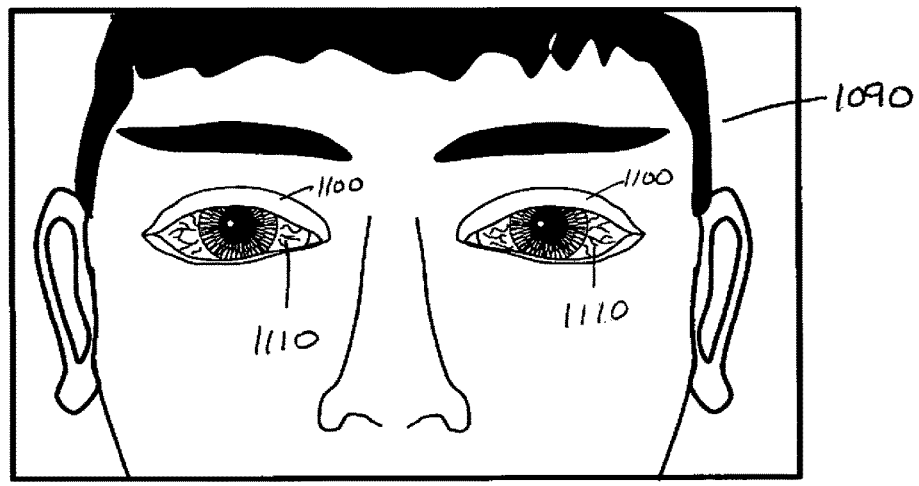
Figure 6F:

FIGS. 6a-6f are graphic illustrations of various types of eye related artifacts. Referring now to FIG. 6a an example of eyewear induced magnification distortion 1000 (High minus lenses) is shown including the eyewear frame 890, high minus eyewear lens 900, eyewear lens induced magnification distortion 910 (high minus lenses), and eyewear lens induced eye magnification distortion 920 (high minus lenses) as previously explained. Referring now to FIG. 6b an example of eyewear induced magnification distortion 1010 (high plus lenses) is shown including the eyewear frame 890, high plus eyewear lens 1020, and eyewear lens induced eye magnification distortion 1025 (high plus lenses). Referring now to FIG. 6c an example of an eyewear lens induced eye related artifact 1030 (lens flare) is shown, including a lens flare obscuring eye image 1040, and an eyewear lens 1050. Referring now to FIG. 6d, an example of an eye related physical condition 1060 (cataract) is shown, including an eye image 1070 and a discolored pupil 1080 (cataract). Referring now to FIG. 6e, an example of an eye related physical condition 1090 (discolored sclera) is shown including an eye image 1100 and a discolored pupil 1110 (bloodshot eyes or subconjunctival hemorrhage). Referring now to FIG. 6f, an example of a potential eye related physical condition 1120 (closed eye or amblyopia) is shown including a normal eye image, an opened eye lid 1140, a closed eye lid 1150, and an obscured eye image 1160.

FIGS. 7a-7b are graphic illustrations of a constricted and dilated human eye. FIG. 7a shows a human eye iris 1170, a human eye pupil 1180 (constricted), and a human eye sclera 1190. FIG. 7b shows a human eye pupil 1200 (dilated) and a human eye catch light 1210.

FIGS. 8a-8b are graphic illustrations of a constricted and dilated feline eye. FIG. 8a shows a feline eye iris 1220, a feline eye pupil 1230 (constricted), and a feline eye sclera 1240. FIG. 8b shows a feline eye pupil 1250 (dilated) and a feline eye catch light 1260.

FIGS. 9a-9b are graphic illustrations of a constricted and dilated canine eye. FIG. 9a shows a canine eye iris 1270, a canine eye pupil 1280 (constricted), and a canine eye sclera 1290. FIG. 9b shows a canine eye pupil 1300 (dilated) and a canine eye catch light 1310.

FIGS. 10a-10b are graphic illustrations of a constricted and dilated sheep/goat eye. FIG. 10a shows a sheep/goat eye iris 1320, a sheep/goat eye pupil 1330 (constricted), and a sheep/goat eye sclera 1340. FIG. 10b shows a sheep/goat eye pupil 1350 (dilated) and a sheep/goat eye catch light 1360.

Figure 11A:
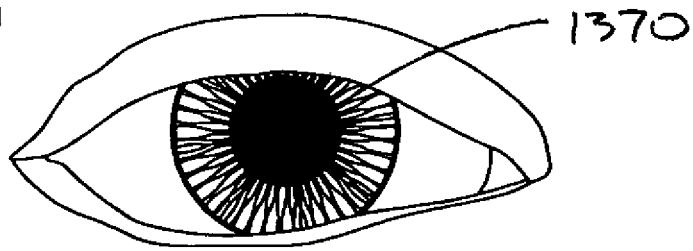
FIGS. 11a-11e are graphic illustrations of human eyes with various types of digitally created catch lights.
Figure 11B:
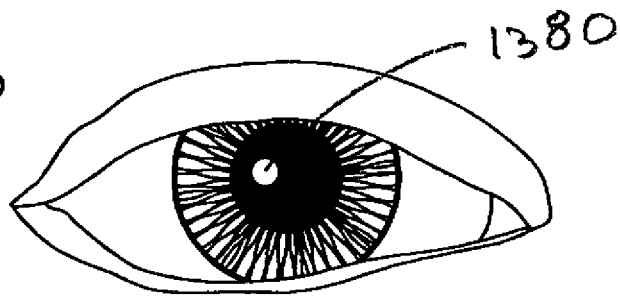
Figure 11C:
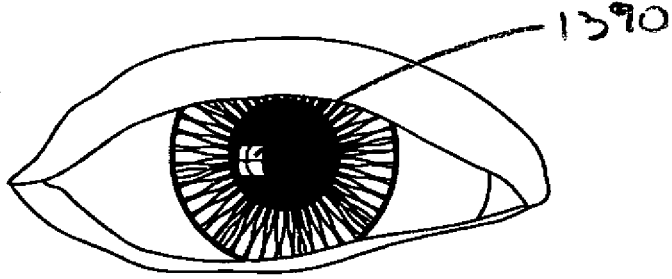
Figure 11D:
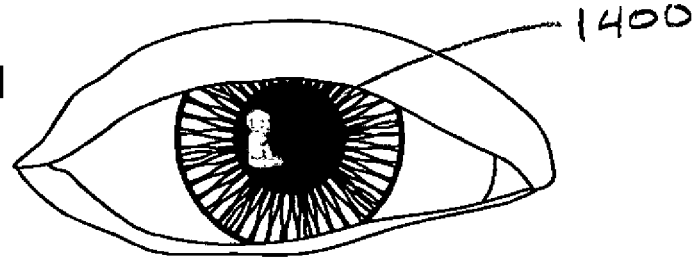
Figure 11E:
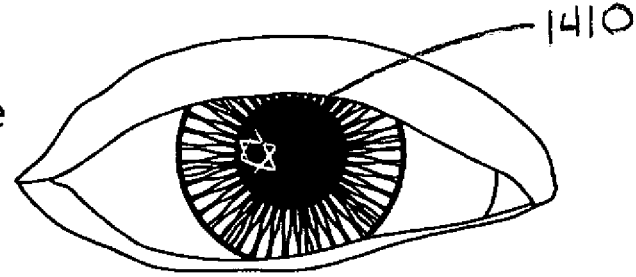
Figure 12:
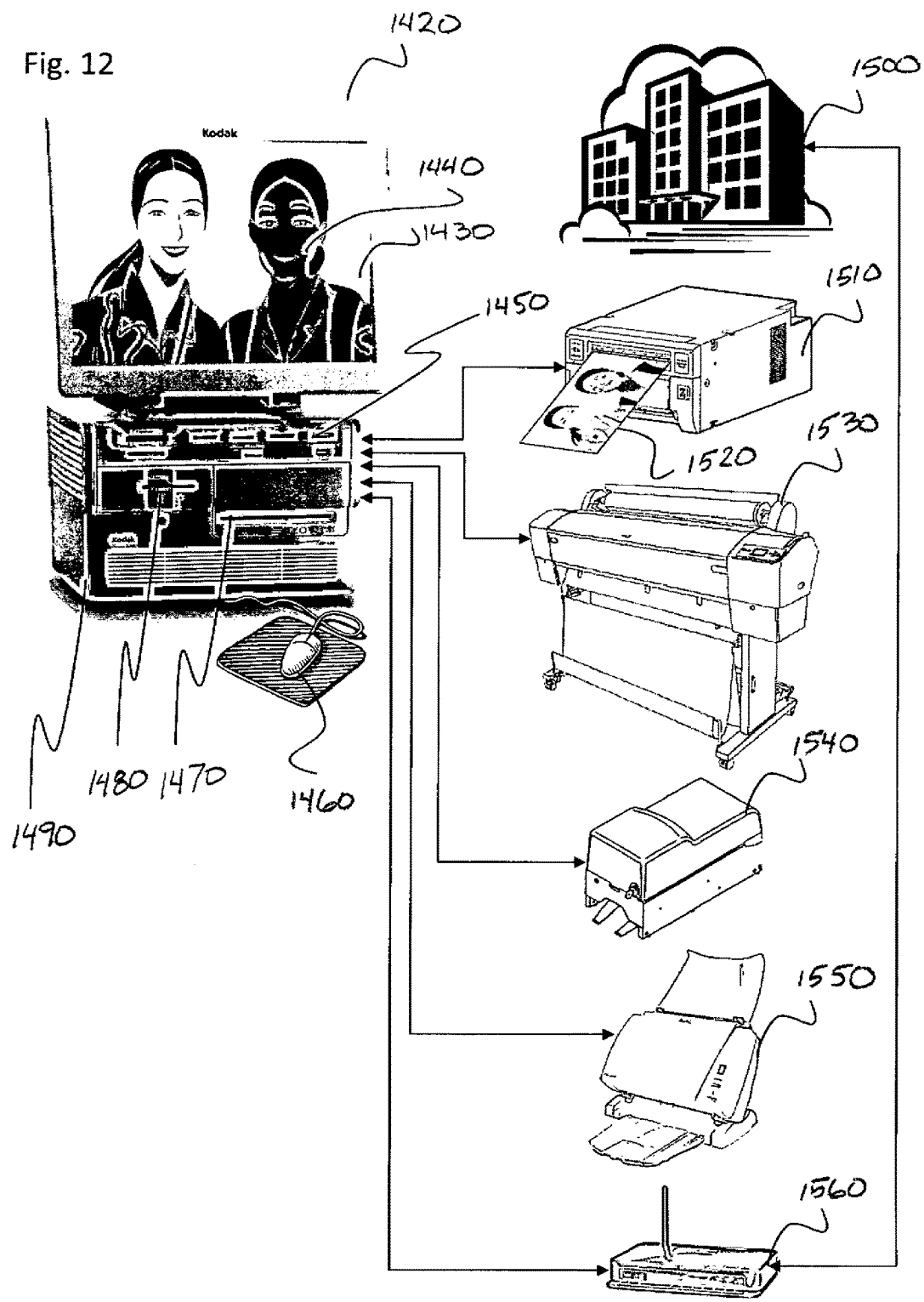
FIG. 12 is an illustration of a kiosk for providing the eye artifact correction method of the present invention.

FIGS. 11a-11e are graphic illustrations of human eyes with various types of digitally created catch lights. FIG. 11a shows a human pupil 1370 without catch light. FIG. 11b shows a human pupil 1380 with an artificial spot catch light. FIG. 11c shows a human pupil 1390 with an artificial window catch light. FIG. 11d shows a human pupil 1400 with an artificial child image catch light. FIG. 11e shows a human pupil 1410 with artificial religious symbol image catch light FIG. 12 is an illustration of a kiosk for providing the eye artifact correction method of the present invention. A user operated retail Photo Kiosk 1420 for creating hard and soft copy photo products from user provided images 1440. Templates, graphics, image processing software, accessible by the kiosk computer 1490. User images 1440 are provided as digital files on camera cards readable via the Multi-format memory card interface 1450, CD/DVD read/write drive 1470, wirelessly transmitted from smart phones and wireless cameras via wireless router 1560, or Bluetooth interface, not shown. User Images 1440 can also be provided via remote photo accounts, not shown or scans of hard copy prints via print scanner 1550. User interfaces for programs selections, product ordering, image editing, and payment are provided via touch screen 1430 and Pointing device/UI 1460, and optionally voice and gesture interface, not shown. Kiosk 1420 also includes Credit Card payment mechanism 1480 for users to provide order payment, but other payment mechanisms such as wireless near field communications from a smart phone, or a currency reader/acceptor can also be used. Hard copy photographic output products such as prints, enlargements, greeting cards, and the like in the form of Thermal Prints 1520 are printed on Thermal Printer 1510. More complex photo products such as photo books, photo calendars, online slide shows are produced at the Remote Fulfillment Facility 1500. Large posters and wall décor is produced on Large format inkjet printer 1530 and soft copy image produces for storage and interactive presentations are produced on High Speed DVD writer 1540.

The invention has been described in detail with particular reference to certain preferred embodiments thereof, but it will be understood that variations and modifications can be effected within the spirit and scope of the invention.

PARTS LIST

10 Image analysis step
20 Eye artifact decision step
30 Physical condition decision step
40 UI selection override decision step
50 Human subject decision step
60 Artifact indication step
70 Eyeglass induced decision step
80 Animal type decision step
90 Select animal type step
100 Determine artifact severity step
110 Eye artifact lens flare induced decision step
120 Artifact correctible without related image decision step
130 Are related images available decision step
140 Identify Positive or Negative magnification distortion step
150 Select appropriate eye image step
160 Predict eye color from metadata/image analysis step
170 Select appropriate eye model step
180 Scale to fit image step
190 Apply selected correction step
200 Select alternative correction step
210 Is correction satisfactory decision step
220 Process completion step
230 Artifact type column
240 Artifact severity column
250 Available resources column
260 Correction method column
270 Illuminant, low severity, with replacement images row
280 Illuminant, low severity, without replacement images row
290 Illuminant, medium severity, with replacement images row
300 Illuminant, medium severity, without replacement images row
310 Illuminant, high severity, with replacement images row
320 Illuminant, high severity, without replacement images row
330 Eyewear related distortion with replacement images row
340 Eyewear related distortion without replacement images row
350 Eyewear related flare, high severity with replacement images row
360 Eyewear related flare, high severity without replacement images row
370 Physical eye condition (discolored sclera) with replacement images row
380 Physical eye condition (discolored sclera) without replacement images row
390 Physical eye condition (misaligned Iris/Pupil pair) with replacement images row
400 Physical eye condition (misaligned Iris/Pupil pair) without replacement images row
410 Physical eye condition (cataract) row
420 Physical eye condition (damaged eye) row
430 Graphic User Interface to correct scene illumination related eye artifacts in humans
440 First subject with illumination related eye artifact
450 Second subject without illumination related eye artifact
460 Eye artifact indication icon
470 Illumination related eye artifact
480 Close-up navigation tool icon
490 Color sampler tool icon
500 Eyewear tool icon
510 Animal tool icon
520 Manual editing tool icon
530 Ring-a-round user interface
540 Save file icon
550 Re-do icon
560 Un-do icon
570 $1^{st}$ ranked replacement image
580 $1^{st}$ ranked image metadata indicator
590 $2^{nd}$ ranked replacement image
600 $2^{nd}$ ranked image metadata indicator
610 $3^{rd}$ ranked replacement image
620 $3^{rd}$ ranked image metadata indicator
630 $4^{th}$ ranked replacement image
640 $4^{th}$ ranked image metadata indicator
650 Eye model for a female human
660 Eye model type indication
670 Corrected eye artifact
680 Graphic User Interface to correct scene illumination related eye artifacts in animals
690 First animal subject with illumination related eye artifact
700 Second animal subject with illumination related eye artifact
710 Eye artifact indication icon (light color complimentary to subject color)
720 Illumination related eye artifact
730 Eye artifact indication icon (dark color complimentary to subject color)
740 Illumination related eye artifact
750 $1^{st}$ ranked replacement image for first animal subject (pupils constricted)
760 $1^{st}$ ranked image metadata indicator
770 $2^{st}$ ranked replacement image for first animal subject (pupils dilated)
780 $2^{st}$ ranked image metadata indicator
790 $1^{st}$ ranked replacement image for second animal subject (pupils constricted)
800 $1^{st}$ ranked image metadata indicator 810 2ⁿᵈ ranked replacement image for second animal subject (pupils dilated)
820 2ⁿᵈ ranked image metadata indicator
830 Eye model for animal type (cat)
840 Eye model type indication
850 Corrected eye artifact (using 1ˢᵗ ranked first subject replacement image)
860 Corrected eye artifact (using 1ˢᵗ ranked second subject replacement image)
870 Graphic User Interface to correct eyewear related distortions in humans
880 Human subject with eyewear related distortion
890 Eyewear frame
900 High minus eyewear lens
910 Eyewear lens induced magnification distortion (High minus lenses)
920 Eyewear lens induced eye magnification distortion (High minus lenses)
930 1ˢᵗ ranked replacement image of subject without eyewear.
940 1ˢᵗ ranked image metadata indicator
950 Optional modified image with artificially colored lenses to mask uncorrectable eye artifacts
960 Optional correct type indicator
970 Eye model for human male
980 Eye model type indication
990 Corrected eyewear induced distortion
1000 Example of eyewear induced magnification distortion (High minus lenses)
1010 Example of eyewear induced magnification distortion (High plus lenses)
1020 High plus eyewear lens
1025 Eyewear lens induced eye magnification distortion (High plus lenses)
1030 Eyewear lens induced eye related artifact (lens flare)
1040 Lens flare obscuring eye image
1050 Eyewear lens
1060 Example of an eye related physical condition (cataract)
1070 Eye image
1080 Discolored pupil (cataract)
1090 Example of an eye related physical condition (discolored sclera)
1100 Eye image
1110 Discolored pupil (blood-shot eyes or subconjunctival hemorrhage)
1120 Example of a potential eye related physical condition (closed eye or amblyopia)
1130 Normal eye image
1140 Opened eye lid
1150 Closed eye lid
1160 Obscured eye image
1170 Human eye iris
1180 Human eye pupil (constricted)
1190 Human eye sclera
1200 Human eye pupil (dilated)
1210 Human eye catch light
1220 Feline eye iris
1230 Feline eye pupil (constricted)
1240 Feline eye sclera
1250 Feline eye pupil (dilated)
1260 Feline eye catch light
1270 Canine eye iris
1280 Canine eye pupil (constricted)
1290 Canine eye sclera
1300 Canine eye pupil (dilated)
1310 Canine eye catch light
1320 Sheep/goat eye iris
1330 Sheep/goat eye pupil (constricted)
1340 Sheep/goat eye sclera
1350 Sheep/goat eye pupil (dilated)
1360 Sheep/goat eye catch light
1370 Human pupil without catch light
1380 Human pupil with artificial spot catch light
1390 Human pupil with artificial window catch light
1400 Human pupil with artificial child image catch light
1410 Human pupil with artificial religious symbol image catch light
1420 Photo Kiosk
1430 Touch Screen
1440 User Image
1450 Multi-format memory card interface
1460 Pointing device/UI
1470 CD/DVD read/write drive
1480 Credit Card payment mechanism
1490 Computer
1500 Remote Fulfillment Facility
1510 Thermal Printer
1520 Thermal Print
1530 Large format inkjet printer
1540 High Speed DVD writer
1550 Print Scanner
1560 Wireless router

The invention claimed is:

1. A method for identifying and correcting eye artifacts in digital photography comprising:
providing one or more digital images to a computer system;
initiating image analysis via an image processing software accessible through a user interface of the computer system;
identifying an eye artifact type and a subject eye type the one or more digital images;
determining eye artifact severity of the identified eye artifact;
determining an appropriate correction modality considering available subject eye type correction models, wherein the available subject eye type correction models comprise generic models selected and modified with other images having comparable size, color, shape, type, emotional state, and event window;
identifying related images within an event window of a subject without eye artifacts or with less severe eye artifacts using a combination of face detection and clustering algorithms;
selecting a correction modality and/or a related image and correcting the eye artifact;
outputting one or more corrected digital images having a corrected eye artifact, the corrected eye artifact being incorporated into the one or more digital images via application of the correction modality and/or the related image; and
obtaining a user approval.

2. The method of claim 1 wherein the eye artifact type comprises a camera related lighting induced artifact type, an ambient light induced artifact type, an eyewear related artifact type, or a physical condition related artifact type.

3. The method of claim 2 wherein if the artifact type is determined to be a physical condition related artifact type, then the user is alerted and verification is requested to proceed.

4. The method of claim 1 wherein the subject eye type comprises a human eye type or an animal eye type.

5. The method of claim 4 wherein the human eye type comprises classifications that are selected from the group consisting of race, gender, age, eye color, skin color, eyewear, or facial type.

6. The method of claim 4 wherein the animal eye type can be classified according to pupil type.

7. The method of claim 1 wherein determining eye artifact severity comprises determining whether the eye artifact is correctable or requires replacement.

8. The method of claim 1 wherein the available subject eye type correction models are based on eye artifact severity, subject eye type, and eye artifact type.

9. The method of claim 8 wherein the available subject eye type correction models rescale and reposition eyes to compensate for optical distortion due to eyeglasses.

10. The method of claim 8 wherein the available subject eye type correction models re-colorize eyes based on predicted or assigned color.

11. The method of claim 10 wherein the predicted or assigned color is determined using skin tone, hair color, metadata, a social network comment, or user input.

12. The method of claim 8 wherein the available subject eye type correction models re-colorize eyes based on color obtained from other images identified using face detection or image tagging within an event window.

13. The method of claim 8 wherein the available subject eye type correction models are used to correct existing eye images with non-artifact related eye images.

14. The method of claim 13 wherein the non-artifact related eye images are selected using appropriate candidate eye images that are rescaled and edited.

15. The method of claim 8 wherein the available subject eye type correction models comprise generic models selected and modified with predictions from metadata for size, color, shape, type, and emotional state.

16. The method of claim 1 wherein obtaining the user approval comprises accepting, editing, or selecting an alternative correction modality.

17. The method of claim 1 wherein the method is performed at a digital photo kiosk.

* * * * *